(12) United States Patent
Sigal et al.

(10) Patent No.: US 12,293,601 B2
(45) Date of Patent: May 6, 2025

(54) CLASSIFYING DOCUMENTS BASED ON MACHINE LEARNING

(71) Applicant: SAP SE, Walldorf (DE)

(72) Inventors: Lev Sigal, Karmiel (IL); Anna Fishbein, Hadera (IL); Anton Ioffe, Netanya (IL); Iryna Butselan, Netanya (IL)

(73) Assignee: SAP SE, Walldorf (DE)

( * ) Notice: Subject to any disclaimer, the term of this patent is extended or adjusted under 35 U.S.C. 154(b) by 364 days.

(21) Appl. No.: 17/897,022

(22) Filed: Aug. 26, 2022

(65) Prior Publication Data

US 2024/0071121 A1    Feb. 29, 2024

(51) Int. Cl.
*G06V 30/418* (2022.01)
*G06V 30/19* (2022.01)
*G06V 30/413* (2022.01)

(52) U.S. Cl.
CPC ...... *G06V 30/418* (2022.01); *G06V 30/19147* (2022.01); *G06V 30/413* (2022.01)

(58) Field of Classification Search
CPC .............. G06V 30/418; G06V 30/413; G06V 30/19147
USPC ........................................................ 382/190
See application file for complete search history.

(56) References Cited

U.S. PATENT DOCUMENTS

| 11,531,640 | B1* | 12/2022 | Woodward .............. G06F 30/27 |
| 2018/0285344 | A1 | 10/2018 | He et al. |
| 2021/0224306 | A1 | 7/2021 | Choudhary et al. |
| 2022/0083579 | A1 | 3/2022 | Singh et al. |

OTHER PUBLICATIONS

De Souza Pais, Eduardo. Intelligent document validation intelligent document validation using natural language processing and computer vision. MS thesis. Universidade de Coimbra (Portugal), 2021. (Year: 2021).*
Sigal et al., Unpublished U.S. Appl. No. 17/732,730, filed Apr. 29, 2022, 40 pages.

* cited by examiner

*Primary Examiner* — Jonathan S Lee
(74) *Attorney, Agent, or Firm* — Fountainhead Law Group, PC

(57) ABSTRACT

Some embodiments provide a non-transitory machine-readable medium that stores a program. The program receives an image of a document, the document comprising a set of text. The program further provides the set of text to a machine learning model configured to determine, based on the set of text, a plurality of probabilities for a plurality of defined types of documents. Based on the plurality of probabilities for the plurality of defined types of documents, the program also determines a type of the document from the plurality of defined types of documents.

17 Claims, 8 Drawing Sheets

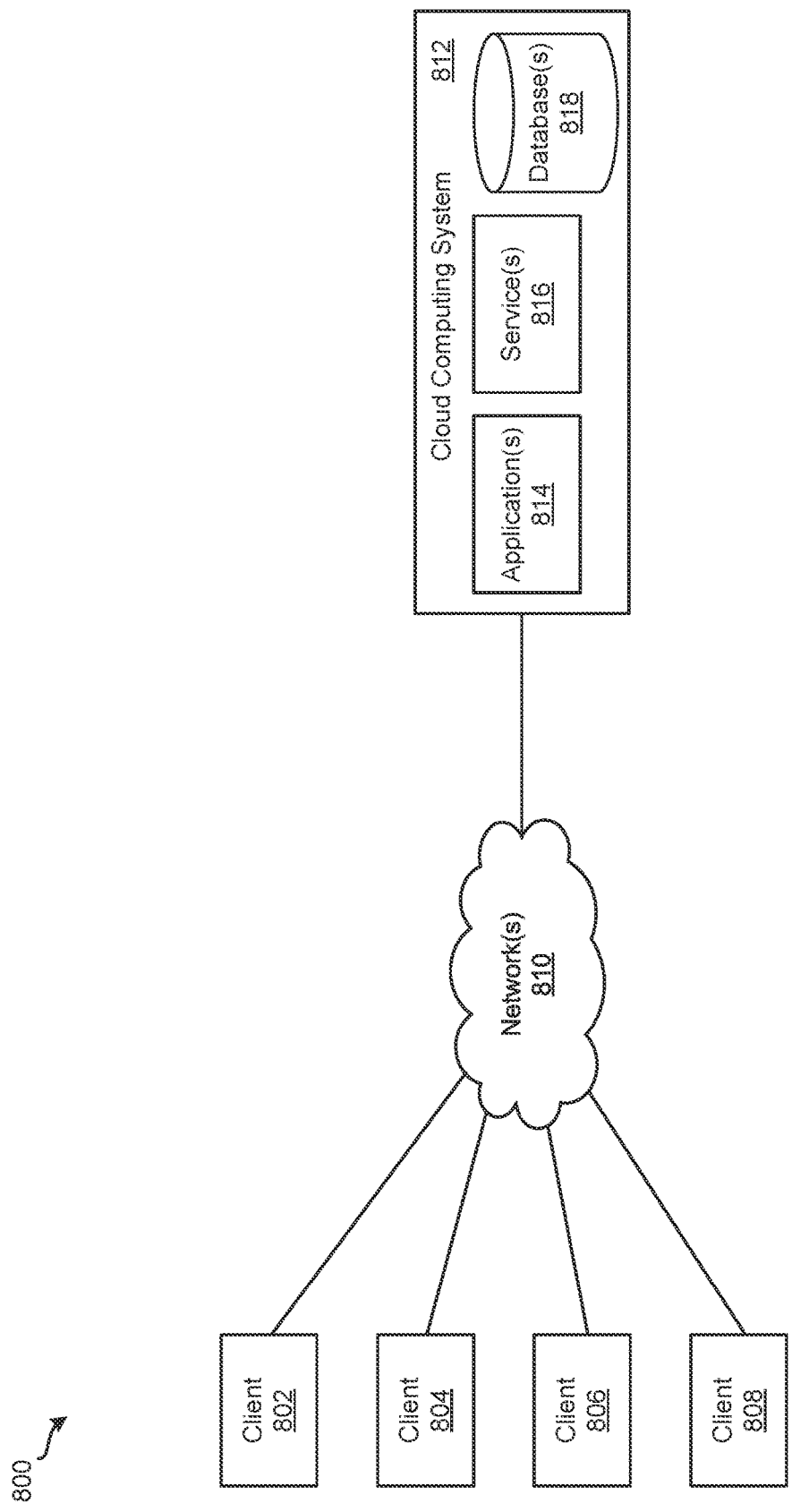

CLASSIFYING DOCUMENTS BASED ON MACHINE LEARNING

BACKGROUND

Machine learning involves the use of data and algorithms to learn to perform a defined set of tasks accurately. Typically, a machine learning model can be defined using a number of approaches and then trained, using training data, to perform the defined set of tasks. Once trained, a trained machine learning model may be used (e.g., performing inference) by providing it with some unknown input data and having trained machine learning model perform the defined set of tasks on the input data. Machine learning may be used in many different applications (e.g., image classification, computer vision, natural language processing, speech recognition, writing recognition, etc.).

SUMMARY

In some embodiments, a non-transitory machine-readable medium stores a program executable by at least one processing unit of a device. The program receives an image of a document, the document comprising a set of text. The program further provides the set of text to a machine learning model configured to determine, based on the set of text, a plurality of probabilities for a plurality of defined types of documents. Based on the plurality of probabilities for the plurality of defined types of documents, the program also determines a type of the document from the plurality of defined types of documents.

In some embodiments, the program further trains the machine learning model using a set of training data. The set of training data comprises a set of text in a set of documents and a set of labels indicating a set of types of documents for the set of documents. The program further extracts the set of text in the set of documents from a set of images of the set of documents. Training the machine learning model comprises providing the extracted set of text to the machine learning model. The machine learning model is further configured to generate a set of outputs based on the extracted set of text. The machine learning model comprises a set of weight values. Training the machine learning model further comprises adjusting set of weight values based on the set of outputs and the set of labels.

In some embodiments, the program further determines the type of the document from the plurality of defined types of documents comprises selecting the defined type of document in the plurality of defined types of documents having the highest probability in the plurality of probabilities. The plurality of defined types of documents includes a receipt type of document, a credit card statement type of document, and a missing receipt affidavit type of document. The machine learning model is a transformer-based machine learning model.

In some embodiments, a method receives an image of a document, the document comprising a set of text. The method further provides the set of text to a machine learning model configured to determine, based on the set of text, a plurality of probabilities for a plurality of defined types of documents. Based on the plurality of probabilities for the plurality of defined types of documents, the method also determines a type of the document from the plurality of defined types of documents.

In some embodiments, the method further trains the machine learning model using a set of training data. The set of training data comprises a set of text in a set of documents and a set of labels indicating a set of types of documents for the set of documents. The method further extracts the set of text in the set of documents from a set of images of the set of documents. Training the machine learning model comprises providing the extracted set of text to the machine learning model. The machine learning model is further configured to generate a set of outputs based on the extracted set of text. The machine learning model comprises a set of weight values. Training the machine learning model further comprises adjusting set of weight values based on the set of outputs and the set of labels.

In some embodiments, the method 8 further determines the type of the document from the plurality of defined types of documents comprises selecting the defined type of document in the plurality of defined types of documents having the highest probability in the plurality of probabilities. The plurality of defined types of documents includes a receipt type of document, a credit card statement type of document, and a missing receipt affidavit type of document. The machine learning model is a transformer-based machine learning model.

In some embodiments, a system comprises a set of processing units and a non-transitory machine-readable medium that stores instructions. The instructions cause at least one processing unit to receive an image of a document, the document comprising a set of text. The instructions further cause the at least one processing unit to provide the set of text to a machine learning model configured to determine, based on the set of text, a plurality of probabilities for a plurality of defined types of documents. Based on the plurality of probabilities for the plurality of defined types of documents, the instructions also cause the at least one processing unit to determine a type of the document from the plurality of defined types of documents.

In some embodiments, the instructions further cause the at least one processing unit to train the machine learning model using a set of training data. The set of training data comprises a set of text in a set of documents and a set of labels indicating a set of types of documents for the set of documents. The instructions further cause the at least one processing unit to extract the set of text in the set of documents from a set of images of the set of documents. Training the machine learning model comprises providing the extracted set of text to the machine learning model. The machine learning model is further configured to generate a set of outputs based on the extracted set of text. The machine learning model comprises a set of weight values. Training the machine learning model further comprises adjusting set of weight values based on the set of outputs and the set of labels.

In some embodiments, the instructions further cause the at least one processing unit to determine the type of the document from the plurality of defined types of documents comprises selecting the defined type of document in the plurality of defined types of documents having the highest probability in the plurality of probabilities. The plurality of defined types of documents includes a receipt type of document, a credit card statement type of document, and a missing receipt affidavit type of document.

The following detailed description and accompanying drawings provide a better understanding of the nature and advantages of various embodiments of the present disclosure.

BRIEF DESCRIPTION OF THE DRAWINGS

FIG. 8 illustrates an exemplary system, in which various embodiments may be implemented.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for classifying documents based on machine learning. In some embodiments, a computing system is configured to manage machine learning models that may be used to classify documents. For example, the computing system can use training data to train a machine learning model to predict, for documents it has not seen before, the types of the documents. After the computing system finishes training a machine learning model, the computing system can use it to classify documents. For instance, the computing system may receive an image of a document that contains text. Next, the computing system extracts the text from the image of the document and provides the extracted text as inputs to the trained machine learning model. Based on the inputs, the machine learning model generates a set of scores for a set of types of documents. Then, the computing system determines the type of the document captured in the image based on the set of scores for the set of types of documents.

Figure 1:
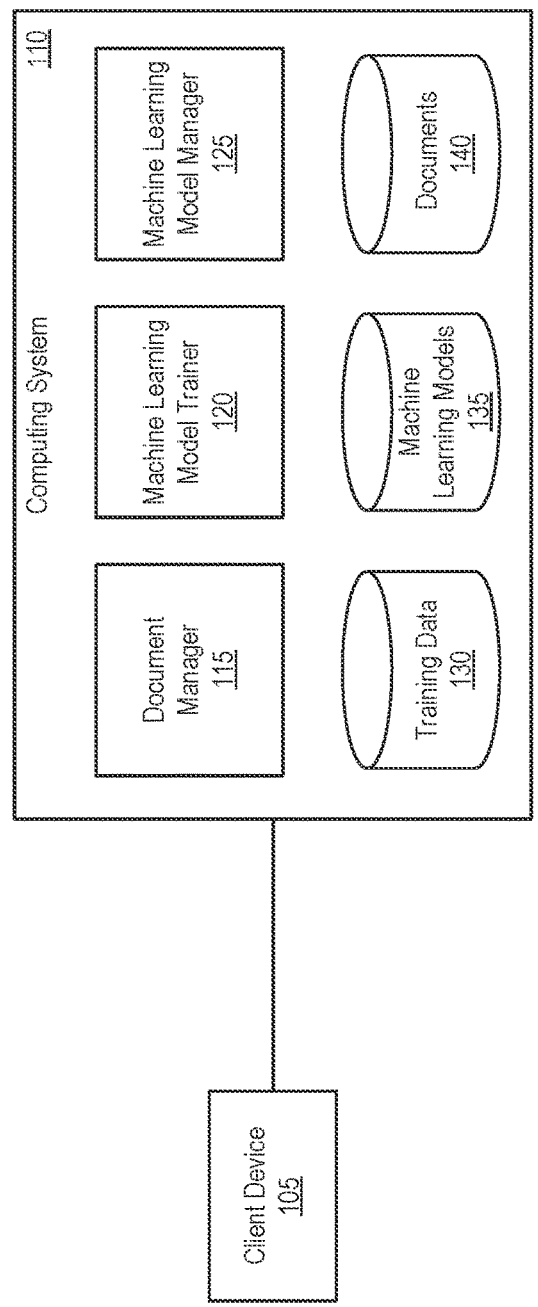
FIG. 1 illustrates a system for classifying documents based on machine learning according to some embodiments.

FIG. 1 illustrates a system 100 for classifying documents based on machine learning according to some embodiments. As shown, system 100 includes client device 105 and computing system 110. Client device 105 is configured to interact and communicate with computing system 110. For example, a user of client device 105 may send computing system 110 an image of a document containing text along with a request to determine the type of document captured in the image. In response to the request, client device 105 can receive from computing system 110 a determination of the type of document captured in the image.

As illustrated in FIG. 1, computing system 110 includes document manager 115, machine learning model trainer 120, machine learning model manager 125, and storages 130-140. Training data storage 130 stores data for training machine learning models. Machine learning models storage 135 is configured to store machine learning models. Documents storage 140 stores document data (e.g., images of documents, text extracted from images of documents, etc.). In some embodiments, storages 130-140 are implemented in a single physical storage while, in other embodiments, storages 130-140 may be implemented across several physical storages. While FIG. 1 shows training data storage 130, machine learning models storage 135, and documents storage 140 as part of computing system 110, one of ordinary skill in the art will appreciate that training data storage 130, machine learning models storage 135, and/or documents storage 140 may be external to computing system 110 in some embodiments.

Document manager 115 is configured to manage documents for computing system 110. For instance, document manager 115 may receive from client device 105 an image of a document that includes text and a request to determine a type of the document captured in the image. In response to receiving the image, document manager 115 extracts the text from the document captured in the image and sends the extracted text to machine learning model manager 125 for further processing. In some embodiments, document manager 115 extracts the text from a document captured in an image using optical character recognition (OCR). In some such embodiments, document manager 115 is further configured to perform the OCR while, in other such embodiments, document manager 115 sends the image to a third-party service or application to perform the OCR on the image.

Machine learning model trainer 120 is responsible for training machine learning models. For example, machine learning model trainer 120 can train a machine learning model by accessing machine learning models storage 135 to retrieve the machine learning model and accessing training data storage 130 to retrieve a set of training data for the machine learning model. Next, machine learning model trainer 120 uses the set of training data to train the machine learning model. After machine learning model trainer 120 finishes training the machine learning model, machine learning model trainer 120 stores the trained machine learning model in machine learning models storage 135. In some embodiments, the machine learning models that machine learning model trainer 120 trains are configured to classify documents.

Machine learning model manager 125 handles the management of machine learning models. For instance, machine learning model manager 125 may receive a request (e.g., from document manager 115, client device 105, an application, a service, another computing device, etc.) to classify a particular document along with text extracted from the particular document. In response to such a request, machine learning model manager 125 accesses machine learning models storage 135 to retrieve a trained machine learning model configured to classify documents. Then, machine learning model manager 125 provides the text extracted from the particular document as inputs to the machine learning model. Based on the text, the machine learning model generates a set of outputs (e.g., a set of scores for a set of types of documents). Based on the set of outputs, machine learning model manager 125 determines a type of document for the particular document. Machine learning model manager 125 stores the determination of the type of document in documents storage 140. In some cases, machine learning model manager 130 also sends the determination of the type of document to the requestor.

Figure 2:
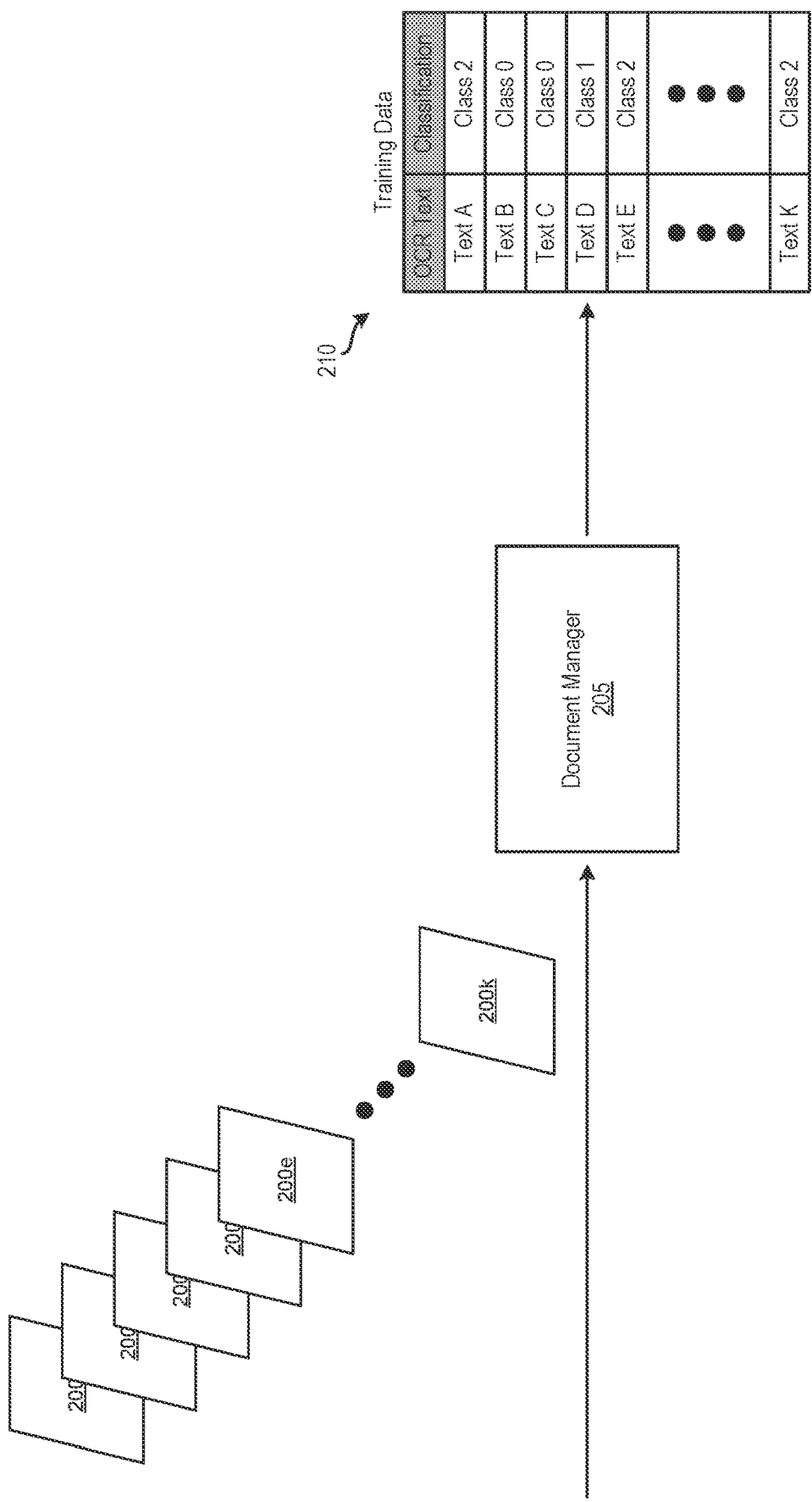
FIG. 2 illustrates an example of generating training data according to some embodiments.
Figure 3:
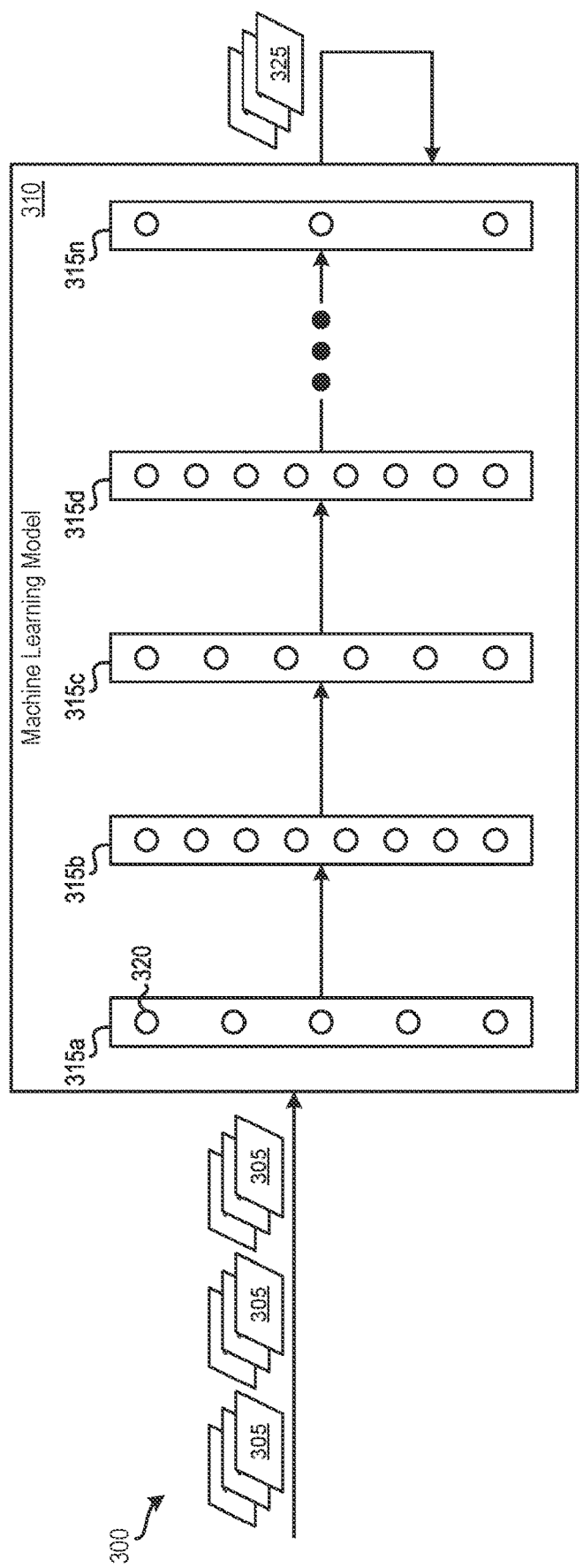
FIG. 3 illustrates an example of training a machine learning model according to some embodiments.

An example operation of system 100 will now be described by reference to FIGS. 1-4. The example operation will demonstrate how computing system 110 classifies a document based on machine learning by showing how training data is generated, how a machine learning model is trained, and how the trained machine learning model used to classify a document. FIG. 2 illustrates an example of generating training data according to some embodiments. Specifically, FIG. 2 depicts images 200*a-k*, document manager 205, and training data 210. In some embodiments, document manager 205 can be used to implement document manager 115. Each of the images 200*a-k* is an image of a document that includes text. For example, such an image may capture a receipt containing items purchased in a transaction, a credit card statement, a missing receipt affidavit, a hotel folio, phone bill, an email, a transport ticket, an invoice, or any other type of document that can contain text. For this example, images 200*a-k* are provided to document manager 205 as inputs. Document manager 205 is configured to extract typed, handwritten, or printed text from images and convert the extracted text into machine-encoded text. In some embodiments, document manager 205 uses OCR to extract text from images 200*a-k*. Upon receiving images 200*a-k*, document manager 205 extracts text from each of the images 200*a-k* and converts the extracted text into machine-encoded text. In this example, document manager 205 performs the text extraction from images 200*a-k*. However, in some embodiments, document manager 205 sends images 200*a-k* to a third-party service or application to perform the text extraction on images 200*a-k*. After extracting text from images 200*a-k*, document manager 205 generates training data 210. As shown in FIG. 2, training data 210 includes the text extracted from each of the images 200*a-k* and a classification for each of the documents captured in images 200*a-k*. In some cases, the classification for each of the documents captured in images 200*a-k* is provided by a user (e.g., a user of client device 105) that reviews images 200*a-k* and determines the classification of the document (e.g., the type of document) captured in each of the images 200*a-k*. Once document manager 205 generates training data 210, document manager 205 may store it (e.g., in training data storage 130) for training machine learning models FIG. 3 illustrates an example of training a machine learning model according to some embodiments. In particular, FIG. 3 illustrates machine learning model 310 being trained with a set of training data 300. For this example, machine learning model 310 is configured to classify documents based on text in the documents. In some embodiments, machine learning model 310 is a transformer-based machine learning model (e.g., a bidirectional encoder representations from transformers (BERT) model, a generative pretrained transformer 2 (GPT-2) model, a generative pretrained transformer 3 (GPT-3) model, a robustly optimized BERT pre-training approach (RoBERTa) model, a lite BERT (ALBERT) model, a DistilBERT model, a StructBERT model, a decoding-enhanced BERT with disentangled attention (DeBERTa) model, etc.). In other embodiments, machine learning model 310 is a non-transformer-based machine learning model (e.g., an XLNet model, a support vector machine (SVM), a naive Bayes classifier, an XGBoost model, a k-nearest neighbors (KNN) model, a fastText model, etc.).

As shown, the set of training data 300 includes several training samples 305. Each training sample 305 can include text extracted from a document and a classification (e.g., the type of document) determined for the document. For example, each training sample 305 may include the OCR text and classification of a row in training data 210. FIG. 3 illustrates that machine learning model 310 includes layers 315*a-n*. Each of the layers 315*a-n* includes a set of nodes 320. Each node 320 in a layer 315 is connected to one or more nodes 320 in the previous layer 315 and one or more nodes in the next layer 315. Each connection between a pair of nodes 320 has a weight associated with it. Each node 320 is configured to receive inputs provided by the nodes connected to it in the previous layer, generate an output based on the inputs and associated weights, and provide the output to each of the nodes to which it is connected in the next layer.

The first layer, layer 315*a*, receives training samples 305 and performs some processing to the training samples 305. For example, layer 315*a* may map, based on an embedding space generated from a vocabulary of words, text in a training sample 305 into a set of word embeddings. In some embodiments, a word embedding is a numerical representations (e.g., vectors with a defined number of dimensions) of a word. The last layer, layer 315*n*, is configured to generate a set of scores (e.g., probabilities) for a set of defined classifications based on the inputs received from nodes in the previous layer 315*m*.

To train machine learning model 310, machine learning model trainer 120 provides the set of training data 300 as inputs to machine learning model 310. For each training sample 305, machine learning model 310 propagates the training sample 305 through the nodes 320 in each of the layers 315*a-n* to produce a set of outputs 325, which is fed back to machine learning model 310. Upon receiving the set of outputs 325, machine learning model 310 determines the differences between the set of outputs 325 and the classifications included in the training samples 305 (i.e., the correct classifications of the documents in the training samples 305) and adjusts the values of the weights associated with the connections between nodes 320 in order to reduce the determine differences. In some embodiments, this feedback process may be implemented using a back propagation technique. Machine learning model trainer 120 can continue to train machine learning model 310 until machine learning model 310 generates outputs such that the differences between the outputs and the classifications of the training samples are below a threshold amount. Once machine learning model 310 reaches this level of accuracy, machine learning model trainer 120 stores the trained machine learning model 310 in machine learning models storage 135.

Figure 4:
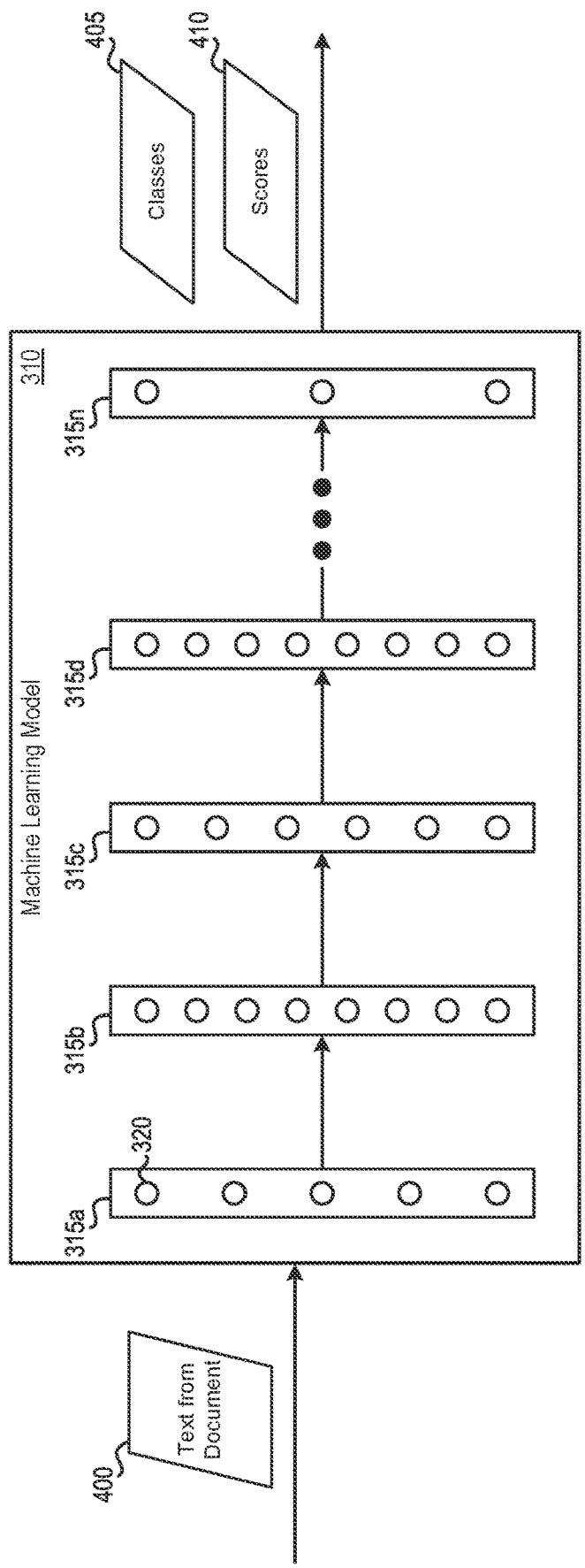
FIG. 4 illustrates using the trained machine learning model illustrated in FIG. 3 for inference according to some embodiments.

FIG. 4 illustrates using the trained machine learning model 310 for inference according to some embodiments. In this example, computing system 110 receives from client device 105 a request to classify a document, which contains a set of text, along with an image of the document.

In some instances, the image of the document is associated with an expense report managed by an expense management system. In some embodiments, computing system 110 is part of the expense management system while, in other embodiments, computing system 110 and the expense management system are separate systems. The expense report may include a set of line items and the document captured in the image is a document associated with acknowledging payment for a line item in the set of line items (e.g., a receipt, a credit card statement, a missing receipt affidavit, etc.). Computing system 110 sends the request and the image of the document to document manager 115. Upon receiving the image, document manager 115 extracts the set of text from the document captured in the image using OCR. Next, document manager 115 sends the extracted text to machine learning model manager 125 for further processing.

When machine learning model manager 125 receives the extracted text, machine learning model manager 125 accesses machine learning models storage 135 to retrieve the trained machine learning model 310. Machine learning model manager 125 then provides the extracted text as inputs to the trained machine learning model 310. In FIG. 4, the text extracted from the document in the image is text from document 400. Machine learning model 310 processes text from document 400 and propagates it through nodes 320 of layers 315*a-n*. Based on text from document 400, machine learning model 310 generates a set of scores 410 for a set of classes 405. For this example, the set of classes 405 are different types of documents (e.g., a receipt containing items purchased in a transaction, a credit card statement, a missing receipt affidavit, a hotel folio, phone bill, an email, a transport ticket, an invoice, etc.). Based on the set of scores 410 for the set of classes 405, machine learning model manager 125 determines a type of document for the document captured in the image. For example, each score in the set of scores 410 may represent that probability that the document is type of document associated with the score. In such an example, machine learning model manager 125 determines the type of document with the highest score as being the type of the document captured in the image. Machine learning model manager 125 sends the determination of the type of the document to client device 105. In some cases, machine learning model manager 125 stores the determination of the type of the document in documents storage 140. In instances where the document is associated with an expense report managed by an expense management system, machine learning model manager 125 stores the determination of the type of the document along with the document and/or the expense report.

Figure 5:
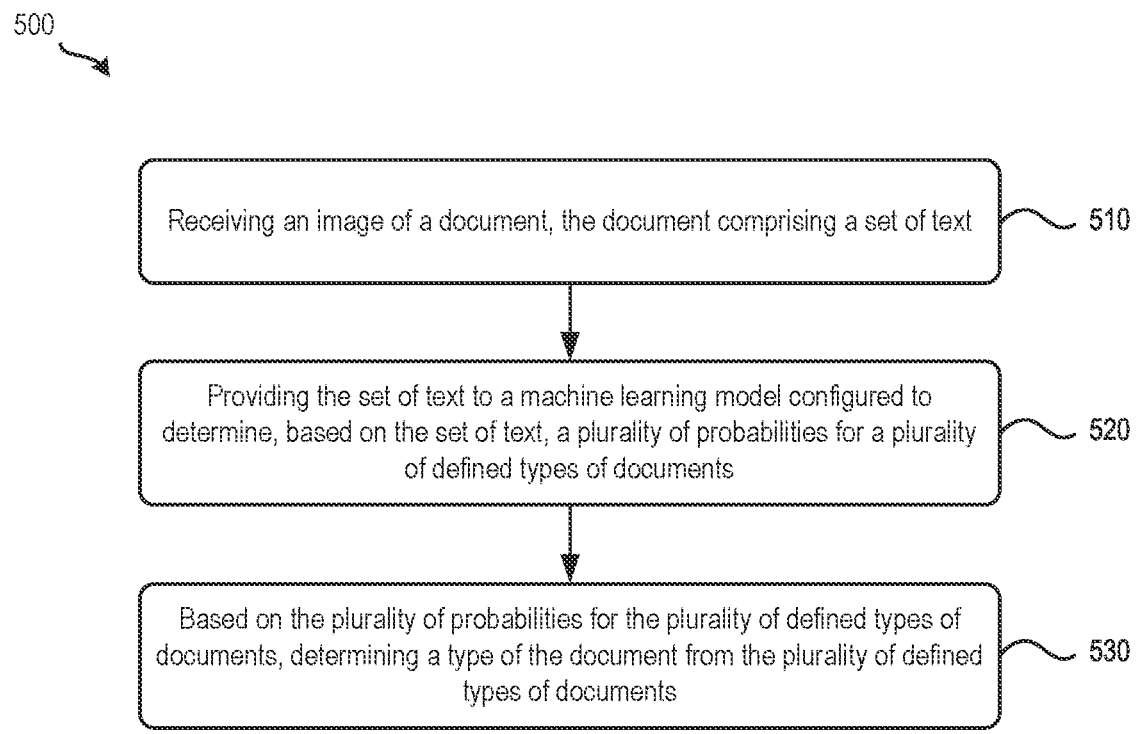
FIG. 5 illustrates a process for classifying documents based on machine learning according to some embodiments.

FIG. 5 illustrates a process 500 for classifying documents based on machine learning according to some embodiments. In some embodiments, computing system 110 performs process 500. Process 500 begins by receiving, at 510, an image of a document, the document comprising a set of text. Referring to FIG. 1 as an example, document manager 115 may receive an image of a document that contains a set of text.

Next, process 500 provides, at 520, the set of text to a machine learning model configured to determine, based on the set of text, a plurality of probabilities for a plurality of defined types of documents. Referring to FIGS. 1, 3, and 4 as an example, document manager 115 can extract the set of text from the document captured in the image using OCR to produce text from document 400. Document manager 115 then sends text from document 400 to machine learning model manager 125. Machine learning model manager 125 accesses machine learning models storage 135 to retrieve trained machine learning model 310 and provides text from document 400 as inputs to trained machine learning model 310.

Finally, based on the plurality of probabilities for the plurality of defined types of documents, process 500 determines, at 530, a type of the document from the plurality of defined types of documents. Referring to FIGS. 1, 3, and 4 as an example, machine learning model 310 processes text from document 400 and propagates it through nodes 320 of layers 315*a-n*. Based on text from document 400, machine learning model 310 generates a set of scores 410 for a set of classes 405. Based on the set of scores 410 for the set of classes 405, machine learning model manager 125 determines a type of document for the document captured in the image.

Figure 6:
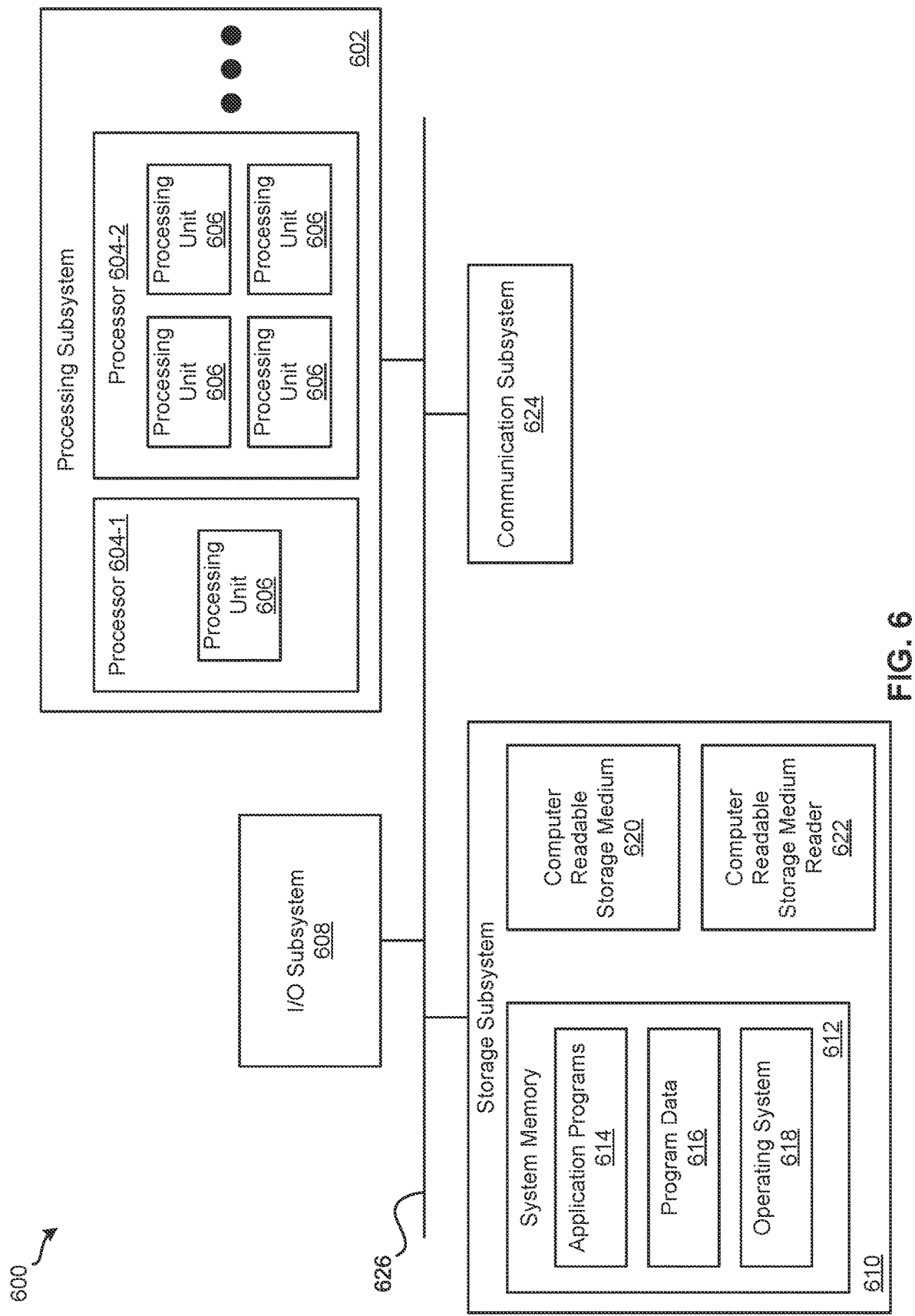
FIG. 6 illustrates an exemplary computer system, in which various embodiments may be implemented.

FIG. 6 illustrates an exemplary computer system 600 for implementing various embodiments described above. For example, computer system 600 may be used to implement client device 105 and computing system 110. Computer system 600 may be a desktop computer, a laptop, a server computer, or any other type of computer system or combination thereof. Some or all elements of document manager 115, machine learning model trainer 120, machine learning model manager 125, or combinations thereof can be included or implemented in computer system 600. In addition, computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614, program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., database manager 125 and data loading manager 130) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
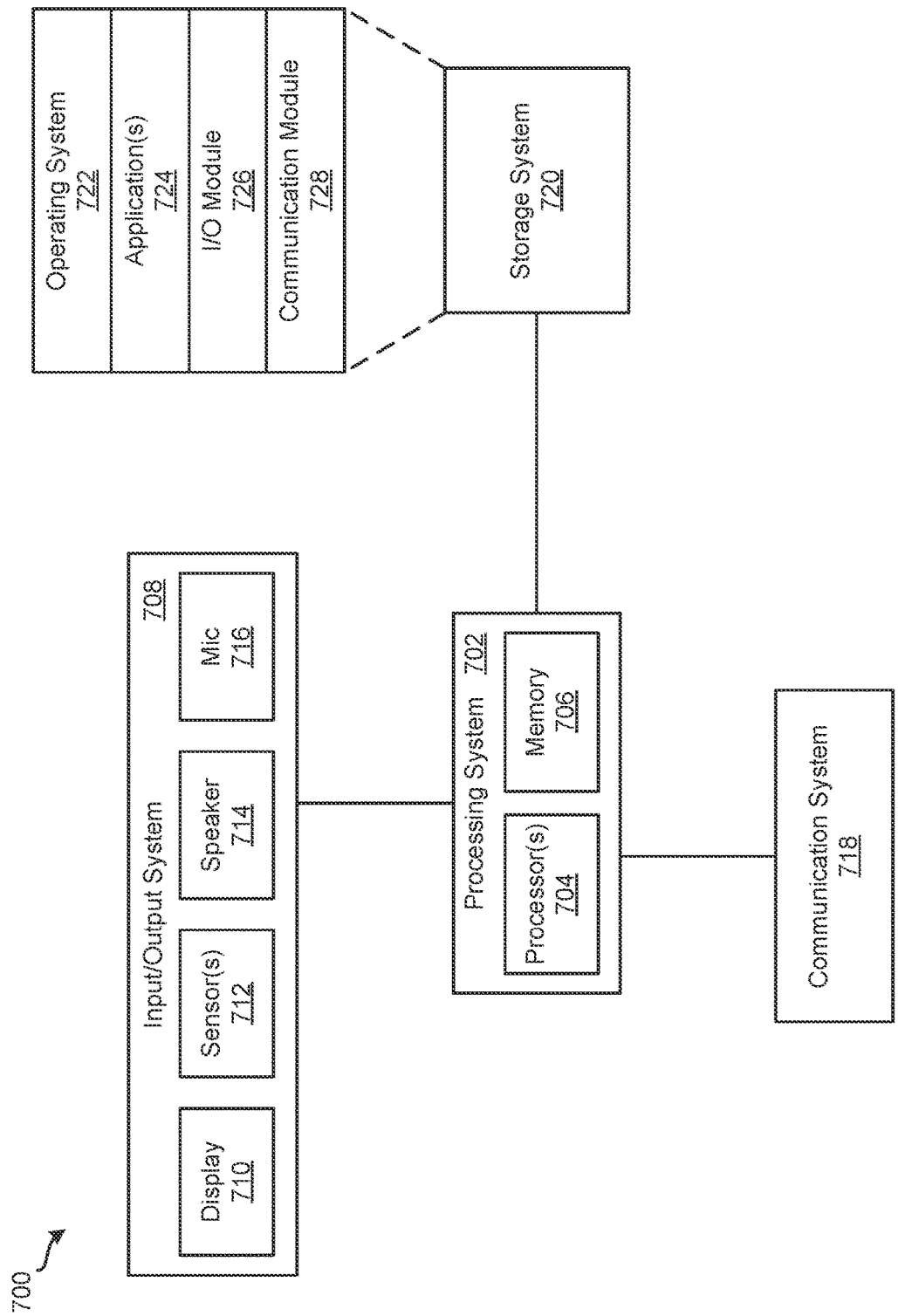
FIG. 7 illustrates an exemplary computing device, in which various embodiments may be implemented.

FIG. 7 illustrates an exemplary computing device 700 for implementing various embodiments described above. For example, computing device 700 may be used to implement client device 105. Computing device 700 may be a cellphone, a smartphone, a wearable device, an activity tracker or manager, a tablet, a personal digital assistant (PDA), a media player, or any other type of mobile computing device or combination thereof. As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrated into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

FIG. 8 illustrates an exemplary system 800 for implementing various embodiments described above. For example, one of the client devices 802-808 may be used to implement client device 105 and cloud computing system 820 may be used to implement computing system 110. As shown, system 800 includes client devices 802-808, one or more networks 810, and cloud computing system 812. Cloud computing system 812 is configured to provide resources and data to client devices 802-808 via networks 810. In some embodiments, cloud computing system 812 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 812 may provide applications 814, services 816, and databases 818 to any number of different customers in a self-service, subscription-based, elastically scalable, reliable, highly available, and secure manner.

In some embodiments, cloud computing system 812 may be adapted to automatically provision, manage, and track a customer's subscriptions to services offered by cloud computing system 812. Cloud computing system 812 may provide cloud services via different deployment models. For example, cloud services may be provided under a public cloud model in which cloud computing system 812 is owned by an organization selling cloud services and the cloud services are made available to the general public or different industry enterprises. As another example, cloud services may be provided under a private cloud model in which cloud computing system 812 is operated solely for a single organization and may provide cloud services for one or more entities within the organization. The cloud services may also be provided under a community cloud model in which cloud computing system 812 and the cloud services provided by cloud computing system 812 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 812 is referred to as a "cloud service." Typically, servers and systems that make up cloud computing system 812 are different from the on-premises servers and systems of a customer. For example, cloud computing system 812 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transfer protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, storages 130-140 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 812. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for an expense management system, the sets of instructions comprising:
receiving an image of a document associated with acknowledging payment for a line item in a set of line items for an expense report, the document comprising a set of text;
providing the set of text to a machine learning model configured to determine, based on the set of text, a plurality of probabilities for a plurality of defined types of documents, wherein the plurality of defined types of documents includes a credit card statement type of document, and a missing receipt affidavit type of document;
based on the plurality of probabilities for the plurality of defined types of documents, determining a type of the document from the plurality of defined types of documents; and
storing the determination of the type of the document along with the expense report.

2. The non-transitory machine-readable medium of claim 1, wherein the program further comprises a set of instructions for training the machine learning model using a set of training data, the set of training data comprising a set of text in a set of documents and a set of labels indicating a set of types of documents for the set of documents.

3. The non-transitory machine-readable medium of claim 2, wherein the program further comprises a set of instructions for extracting the set of text in the set of documents from a set of images of the set of documents, wherein training the machine learning model comprises providing the extracted set of text to the machine learning model, the machine learning model configured to generate a set of outputs based on the extracted set of text.

4. The non-transitory machine-readable medium of claim 3, wherein the machine learning model comprises a set of weight values, wherein training the machine learning model further comprises adjusting set of weight values based on the set of outputs and the set of labels.

5. The non-transitory machine-readable medium of claim 1, wherein the program further comprises a set of instructions for determining the type of the document from the plurality of defined types of documents comprises selecting the defined type of document in the plurality of defined types of documents having the highest probability in the plurality of probabilities.

6. The non-transitory machine-readable medium of claim 1, wherein the machine learning model is a transformer-based machine learning model.

7. A method comprising:
receiving an image of a document associated with acknowledging payment for a line item in a set of line items for an expense report, the document comprising a set of text;
providing the set of text to a machine learning model configured to determine, based on the set of text, a plurality of probabilities for a plurality of defined types of documents, wherein the plurality of defined types of documents includes a credit card statement type of document, and a missing receipt affidavit type of document;
based on the plurality of probabilities for the plurality of defined types of documents, determining a type of the document from the plurality of defined types of documents; and
storing the determination of the type of the document along with the expense report.

8. The method of claim 7 further comprising training the machine learning model using a set of training data, the set of training data comprising a set of text in a set of documents and a set of labels indicating a set of types of documents for the set of documents.

9. The method of claim 8 further comprising extracting the set of text in the set of documents from a set of images of the set of documents, wherein training the machine learning model comprises providing the extracted set of text to the machine learning model, the machine learning model configured to generate a set of outputs based on the extracted set of text.

10. The method of claim 9, wherein the machine learning model comprises a set of weight values, wherein training the machine learning model further comprises adjusting set of weight values based on the set of outputs and the set of labels.

11. The method of claim 7 further comprising determining the type of the document from the plurality of defined types of documents comprises selecting the defined type of document in the plurality of defined types of documents having the highest probability in the plurality of probabilities.

12. The method of claim 7, wherein the machine learning model is a transformer-based machine learning model.

13. A system comprising:
a set of processing units; and
a non-transitory machine-readable medium storing instructions that when executed by at least one processing unit in the set of processing units cause the at least one processing unit to:
receive an image of a document associated with acknowledging payment for a line item in a set of line items for an expense report, the document comprising a set of text;
provide the set of text to a machine learning model configured to determine, based on the set of text, a plurality of probabilities for a plurality of defined types of documents, wherein the plurality of defined types of documents includes a credit card statement type of document, and a missing receipt affidavit type of document;
based on the plurality of probabilities for the plurality of defined types of documents, determine a type of the document from the plurality of defined types of documents; and
store the determination of the type of the document along with the expense report.

14. The system of claim 13, wherein the instructions further cause the at least one processing unit to train the machine learning model using a set of training data, the set of training data comprising a set of text in a set of documents and a set of labels indicating a set of types of documents for the set of documents.

15. The system of claim 14, wherein the instructions further cause the at least one processing unit to extract the set of text in the set of documents from a set of images of the set of documents, wherein training the machine learning model comprises providing the extracted set of text to the machine learning model, the machine learning model configured to generate a set of outputs based on the extracted set of text.

16. The system of claim 15, wherein the machine learning model comprises a set of weight values, wherein training the machine learning model further comprises adjusting set of weight values based on the set of outputs and the set of labels.

17. The system of claim 13, wherein the instructions further cause the at least one processing unit to determine the type of the document from the plurality of defined types of documents comprises selecting the defined type of document in the plurality of defined types of documents having the highest probability in the plurality of probabilities.

* * * * *